US009350213B2

(12) United States Patent
De Vries

(10) Patent No.: US 9,350,213 B2
(45) Date of Patent: May 24, 2016

(54) INERTIAL ENERGY ACCUMULATING DEVICE

(75) Inventor: Carl Maria De Vries, Nieuwegein (NL)

(73) Assignee: S4 Energy B.V., Rotterdam (NL)

( * ) Notice: Subject to any disclaimer, the term of this patent is extended or adjusted under 35 U.S.C. 154(b) by 45 days.

(21) Appl. No.: 14/002,156

(22) PCT Filed: Mar. 8, 2012

(86) PCT No.: PCT/NL2012/050143
§ 371 (c)(1),
(2), (4) Date: Jan. 13, 2014

(87) PCT Pub. No.: WO2012/121602
PCT Pub. Date: Sep. 13, 2012

(65) Prior Publication Data
US 2014/0116198 A1    May 1, 2014

(30) Foreign Application Priority Data

Mar. 8, 2011   (NL) ...................................... 2006355

(51) Int. Cl.
*F16F 15/16* (2006.01)
*H02K 7/02* (2006.01)
(Continued)

(52) U.S. Cl.
CPC *H02K 7/025* (2013.01); *F03D 9/02* (2013.01); *F03G 3/08* (2013.01); *F05B 2260/421* (2013.01); *Y02E 10/72* (2013.01); *Y10T 74/2119* (2015.01)

(58) Field of Classification Search
CPC ........... Y02E 60/16; F16F 15/30; H02K 5/24; H02K 7/025; F03D 9/02; F05B 2260/421; Y10T 74/2117; Y10T 74/2119
USPC ............. 74/572.1, 572.11, 573.1; 310/51, 74; 318/161
See application file for complete search history.

(56) References Cited

U.S. PATENT DOCUMENTS 3,203,273 A * 8/1965 Favrot .......................... 74/570.2
4,206,608 A   6/1980 Bell
(Continued)

FOREIGN PATENT DOCUMENTS

FR    2 874 669       3/2006
SU    672410 A1 *    7/1979
(Continued)

OTHER PUBLICATIONS

NL Search Report and Written Opinion of application PCT/NL2012/050143 dated Jan. 16, 2012, 3 pages.

*Primary Examiner* — Adam D Rogers
(74) *Attorney, Agent, or Firm* — Thomas | Horstemeyer, LLP

(57) ABSTRACT

The invention relates to a device for accumulating inertial energy, comprising a housing (12) defining a rotor chamber (16), at least one rotor (18) having a bottom end face (26) and a substantially opposite top end face (24), the rotor (18) being mounted in the rotor chamber (16) so that it can rotate relative to the housing (12) about a vertical axis of rotation (20) leaving free a gap (32), wherein a seal (36) is provided in the gap (32) separating an upper section (34) of the rotor chamber (16) and a bottom section (38) of the rotor chamber (16), a means (40) for exposing at least the bottom end face (26) of the rotor (18) in the bottom section (38) to a gas pressure which, by comparison with the pressure applied to the substantially opposite top end face (24) in the upper section (34) generates an upward differential pressure force that at least partially compensates for the weight of the rotor (18), and the device is provided with means (40) for reducing the pressure in said upper section (18).

20 Claims, 3 Drawing Sheets

(51) Int. Cl.
  *F03D 9/02* (2006.01)
  *F03G 3/08* (2006.01)

(56) References Cited

U.S. PATENT DOCUMENTS 6,727,616 B1    4/2004  Gabrys et al.
8,826,771 B2 *  9/2014  Wiklof ...................... 74/573.11
2005/0050982 A1 *  3/2005  Shimada et al. ................ 74/572
2007/0024058 A1    2/2007  McClintic
2014/0125171 A1 *  5/2014  Bremer et al. ................... 310/74
2014/0210424 A1 *  7/2014  Schroeder ......................... 322/4

FOREIGN PATENT DOCUMENTS

WO    WO 2005041326 A2    5/2005
WO    WO 2010068090 A2    6/2010

* cited by examiner

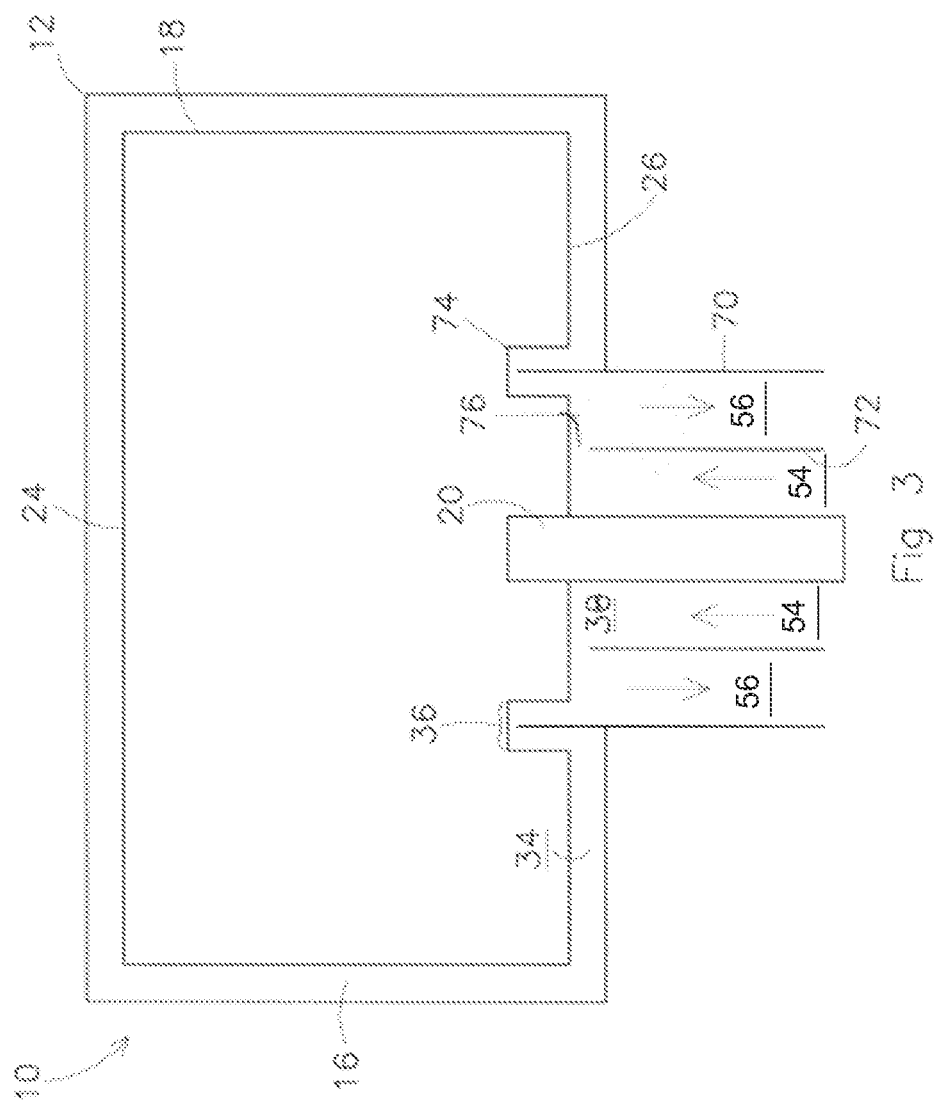

INERTIAL ENERGY ACCUMULATING DEVICE

CROSS-REFERENCE TO RELATED APPLICATION

This application is the National Stage of International Application No. PCT/NL2012/050143, filed Mar. 8, 2012, which claims the benefit of NL 2006355, filed Mar. 8, 2011, the contents of which are incorporated by reference as if fully set forth herein.

FIELD OF THE DISCLOSURE

The present invention relates to an inertial energy accumulating device allowing, for example, absorbing the fluctuations in the production and/or consumption of energy which are associated with a unit for producing energy, such as a wind turbine. A device of this type may also be used to recuperate and then restore or use in some other way a retarding and/or slowing power. The device may also be used to stabilize a rotational speed.

BACKGROUND

Various types of energy storing systems are known. One type is based on flywheels, that is to say on at least one mass set in rotation by input of energy, which will continue to rotate, under inertia, after the energy input has ceased. The rotating mass is connected to a motor which constitutes a means of inputting energy during the energy-storage periods, or a generator during energy-restoring periods. The heavier the flywheel and the more able it is to rotate quickly with the lowest possible friction, the greater the amount of energy that can be stored. The problem with the flywheel bearings, or more generally with how it is pivot-mounted, is therefore of key importance.

In some types of flywheel the bearings are partially relieved of the weight of the flywheel by applying an electromagnetic force.

Another type is described in PCT application PCT/NL2009/000248. This inertial energy accumulation device comprises a frame and at least one flywheel mounted so that it can rotate relative to the frame about an axis of rotation, as well as means for exposing at least one face of the flywheel to a gas pressure which, by comparison with the pressure applied to a substantially opposite face of the flywheel, generates an upward differential pressure force that at least partially compensates for the weight of the flywheel, such as by means of so-called gas flow slowing means surrounding the face of the flywheel that is exposed to the gas pressure. It is stated that in this device not only the flywheel bearings are relieved at least partially of the weight of the flywheel, thus increasing their life, but the cost per kWh is also greatly reduced. These gas flow slowing means make it possible to create a drop in pressure head in the leakage space. They are typically formed between the flywheel and a surface integral with the frame. In an embodiment these flow slowing means comprise a labyrinth seal. In such a seal, the gas flow path comprises a succession of special features that generate drops in pressure head ("head drops"). For example, the cross section for the passage of the gas is alternately reduced and enlarged.

Now it has appeared that in a pilot scale model of a device according to said PCT application the total energy losses are unexpectedly high and as a result the time period that the flywheel can deliver energy, e.g. for charging one or more other appliances is relatively short. Therefore the device cannot be operated in an economically feasible manner.

SUMMARY

The present invention is directed to further improvements of a rotor based inertial energy accumulation device.

It is a general object of the present invention to improve the efficiency of such a device.

It is a further object of the present invention to reduce the energy losses of such a device.

According to the invention the inertial energy accumulation device comprises a housing defining a rotor chamber, at least one rotor having a bottom end face and a substantially opposite top end face, the rotor being mounted in the rotor chamber so that it can rotate relative to the housing about a vertical axis of rotation leaving free a gap, wherein a seal is provided in the gap separating an upper section of the rotor chamber and a bottom section of the rotor chamber, a means for exposing at least the bottom end face of the rotor in the bottom section to a gas pressure which, by comparison with the pressure applied to the substantially opposite top end face in the upper section generates an upward differential pressure force that at least partially compensates for the weight of the rotor, and the device is provided with means for reducing the pressure in said upper section.

The inertial energy accumulation device according to the invention has a housing, which is generally sealed to the environment except for the necessary connections to be described. The inner wall of the housing delimits a rotor chamber. In this rotor chamber a rotor is mounted. The outline of the rotor is defined by a top end face and a bottom end face opposite to the top end face, as well as an upstanding wall between the end faces. The rotor can rotate about a vertical axis of rotation. Usually a rotation shaft extends from both end faces of the rotor into suitable bearings that are provided in the top and bottom of the housing. At least during use a gap is present between the inner walls of the housing and the outer perimeter of the rotor. In this gap a seal is present, the position of which will be discussed hereinafter in more detail. This seal separates an upper part from a lower part of the rotor chamber. The top face of the rotor is contained in the upper section, while the bottom face is contained in the lower part. The device is provided with means (hereinafter also called vacuum means or second means) for reducing the pressure in the upper part, e.g. below 100 mbar, such as 50, 10 or 5 mbar. There is also a means (also called first means) for blowing a gas to the bottom end face of the rotor at an overpressure e.g. 100 mbar relative to the pressure in the upper part of the rotor chamber in order to lift the rotor, thereby compensating for the weight of the rotor and thus reducing the load on the bearings. Due to the low pressure in the upper part the friction between the gas contained in the rotor chamber and the rotor is small. Compared to the device according to PCT application PCT/NL2009/000248 the friction losses are reduced essentially, allowing the device to be operated in an economical feasible manner.

Advantageously the first means are designed in such a way that the absolute gas pressure exerted on the bottom end face of the rotor is less than atmospheric pressure, e.g. in the range of 100-200 mbar.

The rotor may be a straight cylinder. Alternatively it can have a tapered shape, advantageously the rotor is a topped off cone mounted top side down, so that the larger diameter is at the top. The effect of this configuration is that the device has a self-regulating levitation. A (temporary) increase in gas pressure at the bottom of the rotor chamber will lift the rotor further upwards, but simultaneously the passage for the gas in the seal increases thereby reducing the pressure drop and thus the differential pressure between bottom and top face is reduced as a result the levitation is reduced, the total effect being that there is approximately no change in rotor levitation. Similarly a (temporary) decrease of gas flow will be compensated. This enables the rotor to automatically remain at a constant levitation level during use. Advantageously the angle between the circumferential wall of the rotor and its vertical axis of rotation is in the range of 0.25-10°, more preferably up to 3°, such as 1°.

The seal in the gap between the inner walls of the housing and surfaces of the rotor allows a restricted flow of gas from the bottom section of the rotor chamber to the upper section thereof. Advantageously the seal in the gap is a labyrinth seal comprising—as seen in the direction of flow of the gas supplied or sucked away—a series of projections and/or grooves that create drops in pressure head. Typically, the cross-section for the passage of gas in the gap is reduced and enlarged in an alternating manner. Preferably the projections comprised in the labyrinth have an at least partially rounded tip. The rounded tip of a projection provides for a relatively smooth flow of gas from the higher pressure side of a projection to the other side, thereby reducing turbulence, which would adversely affect the stability of the rotor rotation. Advantageously the tip of a projection is wing-shaped. More preferably, the labyrinth is a semi-labyrinth. In the context of this application this expression means that one of the housing and the rotor is provided with a series of vertically spaced apart projections (or recesses), such as rings concentric to the axis of rotation, and that the other one is flat. Typically, the projections or recesses of the labyrinth are provided in the stationary housing of the device according to the invention, whether integral with the housing whether assembled from discrete elements.

In a preferred embodiment the suction side of the vacuum means is connected to the rotor chamber at the position of the seal, e.g. in a recess between adjacent projections of a (semi-) labyrinth. In this embodiment the low pressure in the upper part of the rotor chamber is maintained, while at the same time the gas continuously supplied to the lower part in order to lift the rotor is also removed.

In a further preferred embodiment of a seal, in particular the projections of a semi-labyrinth seal, provided at the stationary housing, advantageously the tips of the projections are situated on a line parallel to the sloping upstanding wall of the rotor. In other words, the inner diameter of the concentric projections increases from the lower part to the upper part proportional to the increase in diameter of the rotor.

In another preferred embodiment the bottom wall of the rotor chamber is provided with a raised central platform, and the bottom end face of the rotor has a recessed shape matching the platform. The first means direct the gas flow in the recess of the bottom end face of the rotor. Preferably the platform has a topped off conical shape, and the bottom end face of the rotor comprises a matching conical recess. The conically recessed bottom end face of the rotor ensures a steady flow of gas to the labyrinth seal, as well as a self-centring effect, thereby increasing the stability of the rotor. Advantageously, the angle of the cone is small, e.g. in the range from a few degrees to 20°.

In this embodiment the seal is preferably positioned in the gap between the outer perimeter of the raised platform and the inner perimeter of the recess.

In another embodiment the device comprises a gas delivery conduit for delivering gas at a relative overpressure to the bottom face of the rotor connected to the lower section of the rotor chamber and a suction conduit for removing gas also connected to the lower section, wherein the conduits are in fluid communication with one another via a small gap at the bottom end face of the rotor. In a further embodiment thereof the device comprises a central gas delivery conduit and an outer concentric suction conduit.

Preferably the delivery side of the means, typically a compressor or vacuum pump, for reducing the pressure in the upper section is connected to the lower section for exposing the bottom end face of the rotor to a relative overpressure. In this embodiment, the device according to the invention comprises a compressor or vacuum pump having a suction side and a delivery side, the delivery side being connected to lower section of the rotor chamber for supplying the gas to the bottom end face of the rotor and the suction side being connected to the housing, preferably at least at the seal, such that the upper section is maintained at a relative low pressure, e.g. less than e.g. 10 mbar. The energy consumed by the compressor during a typical storage period represents only a small percentage of the energy that can be stored in the rotor. This allows, with an economically acceptable loss of energy, recirculating the gas and feeding it again at the desired pressure into the housing at the lower end face of the rotor. Advantageously the suction power of the compressor is such that it is able to apply a vacuum lower than the pressure present in the upper part of the rotor chamber. In such case the sealing efficiency between the lower and upper parts of the rotor chamber is improved.

In an advantageous embodiment, the labyrinth seal, whether integral with the housing or rotor or made from separate elements, is provided with a coating for reducing gas flow friction. Then the majority of the pressure drop is determined by the dimensions and shape of the labyrinth seal. Preferably, the labyrinth is a semi-labyrinth provided at the inner wall of the housing. In addition to a coating of the semi-labyrinth, the rotor may have an outer smooth shell, e.g. made of steel, plastic and carbon.

In yet a further embodiment of the device according to the invention it comprises a control means for controlling the flow rate of the compressor with a view to maintaining predetermined lift conditions on the rotor, particularly a predetermined pressure difference between the two opposite faces of the rotor and/or a predetermined load on bearings such as rolling bearings or plain bearings. Thus overloading of the bearing and destabilization of the rotor can be prevented effectively.

The device may comprise a heat exchanger between the gas suction side and the gas delivery side for cooling the gas. During use the gas heats up due to compression and/or friction between the gas and the rotor. In order to prevent thermal damage to the device the heat exchanger cools the gas when not in contact with the rotor.

The gas sucked in and/or delivered is preferably predominantly made up of air, hydrogen or helium, because of their low coefficients of friction and low viscosities. Generally helium is preferred on account of its stability and its low coefficient of friction.

Generally the rotor is secured to a shaft mounted in bearings. A pinion is coupled in terms of rotation to, but axially decoupled from, the rotor. Thus, the rotor shaft allows rotation of the rotor about the common axis of the rotor and of the shaft. The pinion provides connection to equipment external to the rotor. The axial decoupling between the pinion and the rotor prevents any high axial and/or radial stresses there might be from being transmitted to the gear sets. The pinion allows the rotation of the rotor to be coupled to a source of motive power and/or to energy-consuming external equipment. The coupling may be indirect, particularly if several rotors are coupled together.

The rotor may be a hollow cone, wherein the mass is concentrated in the outer walls and faces. This is in particular applicable to industrial applications. In a preferred embodiment, e.g. for relatively small domestic applications, the rotor is solid, e.g. made from reinforced concrete or metal. If necessary, the rotor may be reinforced by reinforcing elements like crossed spokes.

According to an advantageous embodiment, several rotors can be joined, e.g. using suitable gear sets and transmission wheels, together to form a matrix, all connected directly or otherwise to the same motor and/or the same consumer. Each rotor is provided with its own pinion and bearing. The rotors are then preferably assembled along the lines of concentric rings, with a central rotor and several peripheral rotors. In another configuration several pinions are connected together by two points of contact each. This configuration entails that at least some of the transmission wheels be superposed. Specifically, pairs of transmission wheels composed of two concentric wheels, one externally toothed and the other internally toothed and surrounding the first are preferably used. Each pair preferably drives three pinions by two points of contact each, one point of contact being with the inner wheel of the pair and the other with the outer wheel of the pair. A configuration of this type gives far greater stability in the transmission of energy between the rotors. The mechanical stresses are lower and there is a better distribution of energy between the pinions.

A particular use of the device according to the invention is directed to absorbing fluctuations in the production and/or consumption of energy which are associated with a unit for producing energy, particularly electrical energy, particularly using a wind turbine.

Typically the device according to the invention is connected to a motive source, such as a wind turbine or a motor powered by solar energy, in order to charge the rotor. Discharging typically occurs through a generator in order to convert the rotational speed of the rotor into electricity.

BRIEF DESCRIPTION OF THE DRAWINGS

The several aspects of the invention are further illustrated by the attached drawing, wherein:

FIG. 3 is a schematic presentation of yet another embodiment of the device according to the invention.

DETAILED DESCRIPTION

Figure 1:
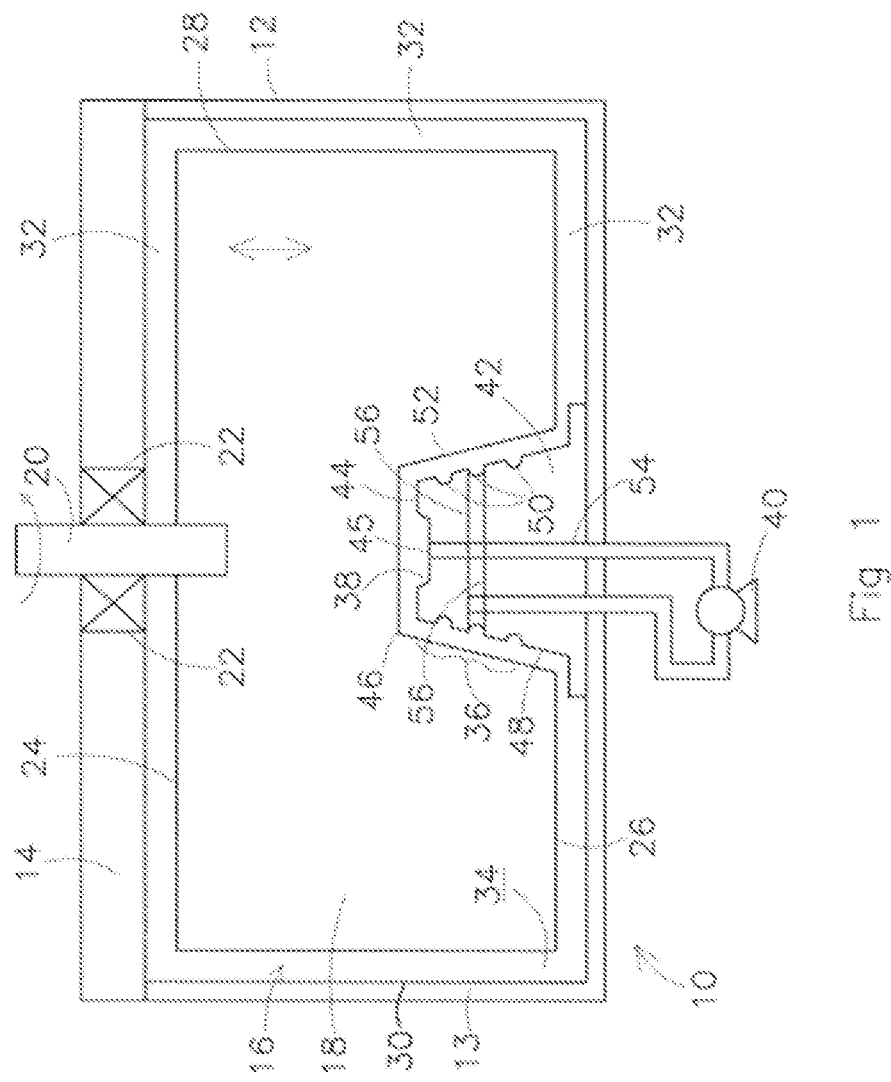
FIG. 1 is a schematic presentation of an embodiment of the device according to the invention.

In the following detailed discussion of the various embodiments shown in the FIGS. 1-3 similar parts are indicated by the same reference numerals.

An inertial energy accumulating device 10 according to the invention comprises a housing 12. The housing 12 may comprise a tray type tank 13 having a lid or cover 14 at the top, as shown in FIG. 1. The housing 12 defines a rotor chamber, which is generally indicated by 16. In the rotor chamber 16 a rotor 18 such as a flywheel having a vertical rotation shaft 20 extending through the housing 12 is rotatable mounted using bearings 22. Typically, the other end of the rotation shaft 20 is mounted in a blind bore (not shown), if necessary, using suitable bearings (also not shown). The solid rotor 18 has a top end face 24 and an opposite bottom end face 26. An upstanding wall 28 connects the two faces 24, 26 and is generally parallel to the upstanding inner wall 30 of the housing 12 leaving free a small gap 32, at least during use. During use, two sections are distinguished in the rotor chamber 16. An upper section 34 is separated by a seal 36 from a lower section 38. Gas is supplied to the lower section 38 by vacuum pump or compressor 40 at a predetermined pressure (e.g. a relative gauge pressure of 100 mbar) and directed to the bottom end face 26, here to a recessed central region 46 upstream from the seal 36. The upper section 34 is maintained at a low pressure, e.g. 5 mbar. Due to the pressure difference between the two sections the weight of the rotor 18 is partially compensated and the rotor 18 is lifted. The two sections 34 and 38 are not hermetically sealed, but instead thereof they are in fluid communication with one another via the seal 36.

In the embodiment shown in FIG. 1, the bottom of the housing 12 is provided with a conical platform 42 having at its top face 44 a small recess 45. The bottom end face 26 of rotor 18 is provided with a recess 46 matching the platform 42. An upstanding face 48 of platform 42 is provided with a number of circumferential channels 50, which together with the opposite flat wall 52 of the recess 46 provides a semi-labyrinth seal 36 as defined hereinbefore. The recess 45 is connected to the gas delivery conduit 54 of the compressor 40. The suction side thereof is connected to one or more of the channels 50 via suction conduit 56. During use the gas supplied to the lower section 38 is sucked away by the compressor, while the vacuum in the upper section 34 is maintained. The vacuum in the upper section 34 contributes to a reduction of the friction between the rotor 18 and the medium in the upper section. In the embodiment as shown the velocity of the gas in the recess 46 is relatively small compared to any gas present in the gap 32 between the upstanding walls of the rotor 18 and the housing 12. This configuration offers a further contribution to the overall friction reduction.

Figure 2:
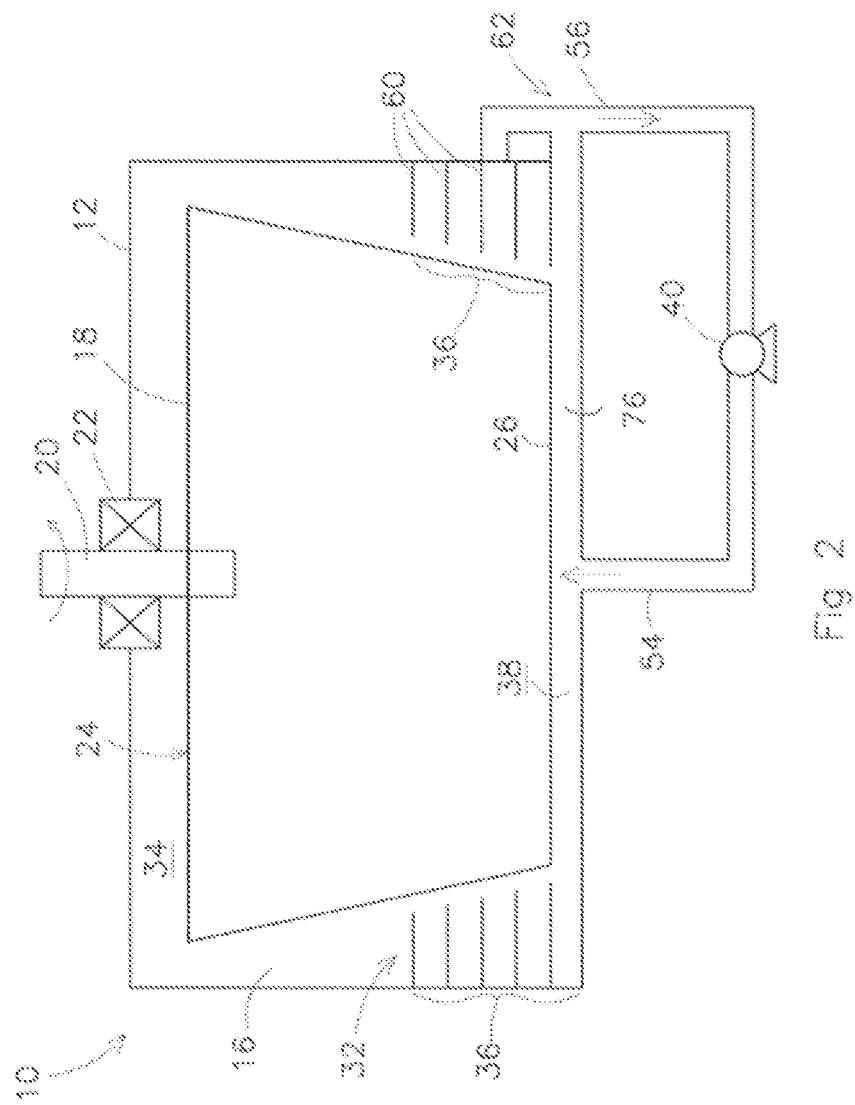
FIG. 2 is a schematic presentation of another embodiment of the device according to the invention.

In the embodiment shown in FIG. 2, the rotor 18 is an inversed topped off cone having a flat bottom end face 26. In this case the seal 36 is assembled from a series of horizontal wing-shaped projections or lamellae 60 that are vertically spaced apart mounted to the inner upstanding wall of the housing 12. The suction conduit 56 is connected to the lower rim part of the housing 12 at 62 and to the seal 36 between two or more lamellae 60. In the device gas delivery conduit 54 and gas suction conduit 56 are in fluid communication via small gap or passage 76.

In the embodiment of FIG. 3 a pipe 70 having a partition 72 surrounds the vertical rotation shaft 20. The pipe 70 extends into an annular recess 74 in the bottom end face 26 forming a seal 36 between the vacuum upper section 34 and lower section 38. The free end 74 of partition 72 is positioned near the bottom end face 26 leaving free a small gap or passage 76. Gas flow is indicated by arrows.

A device according to the invention typically comprises control means using pressure sensors for regulating the operation of the compressor with a view to maintaining predetermined lift conditions on the rotor, particularly a pressure less than 10 mbar in upper section and a predetermined pressure difference between two opposite end faces and/or a predetermined vertical load on bearings of the flywheel. The sensors are typically arranged in the upper and lower sections.

The invention claimed is:

1. A device for accumulating inertial energy, comprising a housing defining a rotor chamber, at least one rotor having a bottom end face and an opposite top end face, the rotor being mounted in the rotor chamber so that it can rotate relative to the housing about a vertical axis of rotation leaving free a gap, wherein a seal is provided in the gap separating an upper section of the rotor chamber and a bottom section of the rotor chamber, a gas conduit for exposing at least the bottom end face of the rotor in the bottom section to a gas pressure which, by comparison with a pressure applied to the opposite top end face in the upper section generates an upward differential pressure force that at least partially compensates for the weight of the rotor, and the device is provided with a suction conduit for reducing the pressure in said upper section.

2. The device according to claim 1, wherein the gas conduit for exposing at least the bottom end face of the rotor to a gas pressure is adapted to expose the bottom end face to a gas pressure of less than 1 atmosphere.

3. The device according to claim 2, wherein the suction conduit for reducing the pressure in the upper section comprises a suction side that is connected at least to the seal.

4. The device according to claim 2, wherein the bottom of the housing is provided with a raised platform.

5. The device according to claim 4, wherein the bottom end face of the rotor is provided with a recess that comprises walls that are parallel to each corresponding side of the raised platform.

6. The device according to claim 2, wherein the gas conduit for exposing at least the bottom end face of the rotor to a gas pressure is designed to expose the bottom end face to a pressure in the bottom section that exceeds the pressure in the upper section, the difference between the pressure in the bottom section and the pressure in the upper section being in the range of 100-200 mbar.

7. The device according to claim 1, wherein the suction conduit for reducing the pressure in the upper section comprises a suction side that is connected at least to the seal.

8. The device according to claim 7, wherein the bottom of the housing is provided with a raised platform and the bottom end face of the rotor is provided with a corresponding recess.

9. The device according to claim 8, wherein the raised platform has an outer perimeter and the corresponding recess has an inner perimeter, and wherein the seal is provided in the gap between the outer perimeter of the raised platform and the inner perimeter of the corresponding recess of the rotor.

10. The device according to claim 1, wherein the bottom of the housing is provided with a raised platform.

11. The device according to claim 10, wherein the raised platform has a conical shape.

12. The device according to claim 10, wherein the bottom end face of the rotor is provided with a recess corresponding to the raised platform, wherein the raised platform has an outer perimeter and the corresponding recess has an inner perimeter, and wherein the seal is provided in the gap between the outer perimeter of the raised platform and the inner perimeter of the corresponding recess of the rotor.

13. The device according to claim 10, wherein the bottom end face of the rotor is provided with a recess that comprises walls that are parallel to each corresponding side of the raised platform.

14. The device according to claim 1, wherein the gas conduit is designed to expose at least the bottom end face of the rotor connected to the bottom section of the rotor chamber to a pressure that exceeds a pressure provided by the suction conduit for removing gas connected to the lower section, wherein the gas conduit and the suction conduit are in fluid communication with one another via a passage at the bottom end face of the rotor.

15. The device according to claim 14, wherein the gas conduit comprises a central gas delivery conduit, and the suction conduit is concentrically arranged around the central gas delivery conduit.

16. The device according to claim 1, wherein the suction conduit for reducing the pressure in the upper section comprises a delivery side that is connected to the bottom section.

17. The device according to claim 1, wherein the suction conduit for reducing the pressure in the upper section is adapted to reduce the pressure below 100 mbar.

18. The device according to claim 17, wherein the suction conduit for reducing the pressure in the upper section is adapted to reduce the pressure below 10 mbar.

19. The device according to claim 1, wherein the rotor is mounted on a vertical rotation shaft, the gas conduit for exposing at least the bottom end face of the rotor comprises a gas supply conduit surrounding the vertical rotation shaft, and the suction conduit for reducing the pressure in the upper section comprises a suction conduit surrounding the gas supply conduit, wherein the bottom end face of the rotor is provided with a recess and a partition between the supply conduit and suction conduit extending into said recess thereby establishing said seal.

20. The device according to claim 1, wherein said gas and suction conduits are connected to a compressor or vacuum pump.

* * * * *